United States Patent
Regef (10) Patent No.: US 11,845,305 B2
(45) Date of Patent: Dec. 19, 2023

(54) DEVICE FOR ELECTRONIC SYSTEM FOR MONITORING THE PRESSURE OF THE TYRES OF A MOTOR VEHICLE

(71) Applicant: ATEQ, Les Clayes sous Bois (FR)

(72) Inventor: Jean Luc Regef, Taipei (TW)

(73) Assignee: ATEQ, Les Clayes sous Bois (FR)

( * ) Notice: Subject to any disclaimer, the term of this patent is extended or adjusted under 35 U.S.C. 154(b) by 275 days.

(21) Appl. No.: 17/242,620

(22) Filed: Apr. 28, 2021

(65) Prior Publication Data

US 2021/0339583 A1    Nov. 4, 2021

(30) Foreign Application Priority Data

Apr. 29, 2020   (FR) ...................................... 2004261

(51) Int. Cl.
  *B60C 23/04*   (2006.01)
(52) U.S. Cl.
  CPC ...... *B60C 23/0416* (2013.01); *B60C 23/0461* (2013.01); *B60C 23/0479* (2013.01)
(58) Field of Classification Search
  CPC ............ B60C 23/0416; B60C 23/0461; B60C 23/0479; B60C 23/0471; H04B 1/3827
  USPC ............................................... 340/572.1, 447
  See application file for complete search history.

(56) References Cited

U.S. PATENT DOCUMENTS

| | | |
|---|---|---|
| 4,398,172 A | 8/1983 | Carroll et al. |
| 4,642,783 A | 2/1987 | Alexander et al. |
| 4,873,654 A | 10/1989 | Alexander et al. |
| 4,904,939 A | 2/1990 | Mian |
| 4,967,485 A | 11/1990 | Brown et al. |
| 4,998,438 A | 3/1991 | Martin |
| 5,608,376 A | 3/1997 | Ito et al. |
| 5,883,306 A | 3/1999 | Hwang |
| 6,081,098 A | 6/2000 | Bertness et al. |

(Continued)

FOREIGN PATENT DOCUMENTS

| | | |
|---|---|---|
| CN | 103921692 A | 7/2014 |
| CN | 204605424 U | 9/2015 |

(Continued)

OTHER PUBLICATIONS

Jacques Mouchet, ATEQ User Manual ATEQ VT 55, Retrieved on Jan. 10, 2013 from the internet: www.orange-electronic,com/en/products/oe_sensor/VT55d-UOS.pdf, Nov. 1, 2009, pp. 1-38.

(Continued)

*Primary Examiner* — Eric Blount
(74) *Attorney, Agent, or Firm* — Young Basile Hanlon & MacFarlane, P.C.

(57) ABSTRACT

A tool device for use with a motor vehicle tire pressure monitoring system (TPMS) operable to send and receive signals to a TPMS tire pressure sensor and a radio frequency identification (RFID) tag positioned in a vehicle tire. In one example, the tool is operable to communicate with the RFID tag to receive information from the RFID tag through an ultra-high frequency communication module and send that received RFID tag information to the tire pressure sensor for storage on the tire pressure sensor. The tool may then retrieve the tire pressure sensor information and associated RFID tag information from the sensor and transmit that information to the motor vehicle on-board computer.

19 Claims, 3 Drawing Sheets

(56) References Cited

U.S. PATENT DOCUMENTS

| | | | |
|---|---|---|---|
| 6,111,524 A | 8/2000 | Lesesky et al. |
| 6,237,723 B1 | 5/2001 | Salsman |
| 6,441,732 B1 | 8/2002 | Laitsaari et al. |
| 6,505,507 B1 | 1/2003 | Imao et al. |
| 6,611,740 B2 | 8/2003 | Lowrey et al. |
| 6,612,165 B2 | 9/2003 | Juzswik et al. |
| 6,718,818 B2 | 4/2004 | Dutt et al. |
| 6,804,999 B2 | 10/2004 | Okubo |
| 6,826,951 B1 | 12/2004 | Schuessler, Jr. et al. |
| 6,904,796 B2 | 6/2005 | Pacsai et al. |
| 6,931,744 B1 | 8/2005 | Ikerd, Jr. et al. |
| 6,937,144 B2 | 8/2005 | Drake et al. |
| 6,980,115 B2 | 12/2005 | Deniau |
| 7,040,151 B2 | 5/2006 | Graham et al. |
| 7,119,661 B2 | 10/2006 | Desai et al. |
| 7,225,666 B2 | 6/2007 | Welch et al. |
| 7,250,852 B1 | 7/2007 | Kell |
| 7,280,898 B2 | 10/2007 | Lesesky et al. |
| 7,449,993 B2 | 11/2008 | Lesesky et al. |
| 7,564,344 B2 | 7/2009 | Deniau et al. |
| 7,589,619 B2 | 9/2009 | DeKeuster et al. |
| 7,623,021 B2 | 11/2009 | Desai et al. |
| 7,639,122 B2 | 12/2009 | Kochie et al. |
| 7,656,162 B2 | 2/2010 | Vonderhaar et al. |
| 7,688,192 B2 | 3/2010 | Kenny et al. |
| 7,694,557 B2 | 4/2010 | Hettle et al. |
| 7,734,391 B2 | 6/2010 | Deniau et al. |
| 7,797,995 B2 | 9/2010 | Schafer |
| 7,810,390 B2 | 10/2010 | Hettle et al. |
| 7,845,091 B2 | 12/2010 | Clark |
| 7,924,148 B2 | 4/2011 | Costello et al. |
| 7,940,052 B2 | 5/2011 | Vonderhaar et al. |
| 7,944,346 B2 | 5/2011 | De Castro et al. |
| 8,035,499 B2 | 10/2011 | Kochie et al. |
| 8,183,993 B2 | 5/2012 | Wittliff et al. |
| 8,186,208 B2 | 5/2012 | Matsumura |
| 8,220,324 B2 | 7/2012 | Kokubu et al. |
| 8,230,689 B2 | 7/2012 | Kmetz et al. |
| 8,502,655 B2 | 8/2013 | Deniau et al. |
| 8,576,060 B2 | 11/2013 | Deniau et al. |
| 8,635,091 B2 | 1/2014 | Amigo et al. |
| 8,674,821 B2 | 3/2014 | Togawa |
| 9,050,862 B2 | 6/2015 | Mouchet |
| 9,051,976 B2 | 6/2015 | Kuwahara et al. |
| 9,091,537 B2 | 7/2015 | Farr et al. |
| 9,122,423 B2 | 9/2015 | McIntyre et al. |
| 9,384,597 B2 | 7/2016 | Koch et al. |
| 9,779,561 B1 | 10/2017 | Dorrance et al. |
| 11,548,331 B2 * | 1/2023 | Destraves ........... B60C 23/0452 |
| 2002/0130771 A1* | 9/2002 | Osborne ............... B60C 23/008 340/441 |
| 2002/0149477 A1 | 10/2002 | Desai et al. |
| 2003/0006895 A1 | 1/2003 | Drake et al. |
| 2003/0048178 A1 | 3/2003 | Bonardi et al. |
| 2003/0145650 A1 | 8/2003 | Juzswik et al. |
| 2004/0150369 A1 | 8/2004 | Deniau |
| 2004/0164140 A1 | 8/2004 | Voeller et al. |
| 2004/0236485 A1 | 11/2004 | Deniau et al. |
| 2005/0030170 A1 | 2/2005 | Rieck et al. |
| 2005/0132792 A1 | 6/2005 | Lemense et al. |
| 2005/0134428 A1 | 6/2005 | Desai et al. |
| 2005/0162263 A1 | 7/2005 | Fennel et al. |
| 2005/0275518 A1* | 12/2005 | Adamson ........... B60C 23/0493 340/447 |
| 2006/0025897 A1 | 2/2006 | Shostak et al. |
| 2006/0049915 A1 | 3/2006 | Deniau et al. |
| 2006/0211410 A1 | 9/2006 | Deniau et al. |
| 2006/0261933 A1 | 11/2006 | Deniau et al. |
| 2007/0069877 A1 | 3/2007 | Fogelstrom |
| 2007/0090919 A1 | 4/2007 | Desai et al. |
| 2007/0090928 A1 | 4/2007 | Deniau et al. |
| 2007/0193349 A1 | 8/2007 | Petrucelli |
| 2008/0110252 A1 | 5/2008 | Cook |
| 2008/0133081 A1 | 6/2008 | Colarelli et al. |
| 2008/0164988 A1 | 7/2008 | DeKeuster et al. |
| 2008/0173082 A1 | 7/2008 | Hettle et al. |
| 2008/0202659 A1 | 8/2008 | Hettle et al. |
| 2008/0204217 A1 | 8/2008 | Costello et al. |
| 2008/0205553 A1 | 8/2008 | Costello et al. |
| 2008/0266068 A1 | 10/2008 | Farrell et al. |
| 2008/0302425 A1 | 12/2008 | Hettle et al. |
| 2009/0000311 A1 | 1/2009 | Kmetz et al. |
| 2009/0033478 A1 | 2/2009 | Deniau et al. |
| 2009/0121856 A1 | 5/2009 | Stegman et al. |
| 2009/0309709 A1 | 12/2009 | Bevacqua et al. |
| 2011/0106464 A1 | 5/2011 | Petrucelli |
| 2011/0140876 A1 | 6/2011 | Deniau |
| 2011/0205047 A1 | 8/2011 | Patel et al. |
| 2011/0221587 A1 | 9/2011 | Katou |
| 2011/0257817 A1 | 10/2011 | Tieman |
| 2012/0117788 A1 | 5/2012 | Deniau et al. |
| 2012/0119895 A1 | 5/2012 | Deniau et al. |
| 2012/0185110 A1 | 7/2012 | Deniau et al. |
| 2012/0197873 A1 | 8/2012 | Uramoto et al. |
| 2012/0232753 A1 | 9/2012 | Lhuillier et al. |
| 2012/0235807 A1 | 9/2012 | Rysenga et al. |
| 2012/0296513 A1 | 11/2012 | Ramseyer |
| 2012/0302191 A1 | 11/2012 | Farrell et al. |
| 2012/0323690 A1 | 12/2012 | Michael |
| 2013/0038440 A1 | 2/2013 | Deniau et al. |
| 2013/0038441 A1 | 2/2013 | Deniau et al. |
| 2013/0038442 A1 | 2/2013 | Deniau et al. |
| 2013/0038443 A1 | 2/2013 | Deniau et al. |
| 2013/0061456 A1 | 3/2013 | Lefaure et al. |
| 2013/0145834 A1 | 6/2013 | Mouchet |
| 2013/0158777 A1 | 6/2013 | Brauer et al. |
| 2013/0169813 A1 | 7/2013 | Schaefer |
| 2013/0185005 A1 | 7/2013 | Petrucelli et al. |
| 2013/0282231 A1 | 10/2013 | Farr et al. |
| 2014/0039752 A1 | 2/2014 | Juzswik |
| 2014/0195099 A1 | 7/2014 | Chen |
| 2014/0279707 A1 | 9/2014 | Joshua et al. |
| 2014/0288859 A1 | 9/2014 | Wittmann |
| 2014/0308971 A1 | 10/2014 | O'Brien et al. |
| 2015/0001539 A1 | 1/2015 | Smith et al. |
| 2015/0015388 A1 | 1/2015 | McIntyre et al. |
| 2015/0015390 A1 | 1/2015 | McIntyre et al. |
| 2015/0029016 A1 | 1/2015 | Lesesky et al. |
| 2015/0054640 A1 | 2/2015 | Huang et al. |
| 2016/0082791 A1 | 3/2016 | Lin |
| 2016/0214445 A1 | 7/2016 | Sogabe |
| 2016/0236522 A1 | 8/2016 | Taki |
| 2017/0028796 A1 | 2/2017 | Patel et al. |
| 2019/0103677 A1 | 4/2019 | Nikitin |

FOREIGN PATENT DOCUMENTS

| | | |
|---|---|---|
| CN | 105784272 A | 7/2016 |
| CN | 104908003 B | 1/2017 |
| DE | 10050984 A1 | 5/2002 |
| DE | 20315000 U1 | 12/2003 |
| DE | 102010026729 A1 | 1/2012 |
| EP | 1026015 A2 | 8/2000 |
| EP | 1769948 A2 | 4/2007 |
| EP | 1972468 A1 | 9/2008 |
| EP | 2777957 A2 | 9/2014 |
| EP | 3 293 019 A1 | 3/2018 |
| GB | 2429819 A | 3/2007 |
| JP | 2008100613 A | 5/2008 |
| JP | 2012201332 A | 10/2012 |
| WO | 9308035 A1 | 4/1993 |
| WO | 0236368 A1 | 5/2002 |
| WO | 2008000491 A1 | 1/2008 |
| WO | 2010115390 A1 | 10/2010 |
| WO | 2017/102191 A1 | 6/2017 |
| WO | 201820143 A1 | 2/2018 |

OTHER PUBLICATIONS

European Intellectual Property Office, International Search Report and Written Opinion, dated Dec. 20, 2013.
European Intellectual Property Office, International Search Report and Written Opinion, dated Mar. 12, 2014.

(56) References Cited

OTHER PUBLICATIONS

ATEQ, Archive website http://web.archive.org/web/20091129111948/http://www.ateq-tpms.com/TPMS-tool-BOX.php, Nov. 29, 2009.
Vitale et al., A Dry Air Leak Test Primer, Jun. 1, 2006, Quality First Systems, Inc.
Doran 360 CE Tire Pressure Monitoring Brochure, Sep. 13, 2012, Doran Manufacturing, LLC, www.DORANMFG.com.
OTC TPM Electronic Torque Wrench model 3822-25, www.otctools.com <http://www.otctools.com>.
KTC Digital Ratchet Torque Wrench Series GEK, www.gaugecity.com <http://www.gaugecity.com>.
Schrader Nut Torque Wrench Set 20139, www.TPMS.com <http://www.TPMS.com>.
ACDelco "ARM303-4A-340 Digital Angle Torque Wrench" Product Information Manual.
Anonymous: "ARM331-21 1/4" Interchangeable Digital Torque Wrench" Jul. 6, 2015 (Jul. 6, 2015), XP055318741, Retrieved from the Internet; URL: http://www.acdelco-tools.com/index.php?route=product/product&product_id-177 [retrieved on Nov. 11, 2016] the whole document.
International Search Report PCT/IB2016/01294, dated Nov. 23, 2016.
Bartec USA TPMS Professionals, TECH400SD—TECH400SD Tool Bartec, pp. 1-2. http://www.bartechusa.com/tech400sd.html. Website last visited Aug. 16, 2016.
ATEQ Quickset TPMS Tool, ATEQ TPMS Light Reset Tool QuickSet, pp. 1-3.
OTC TPR Activation Tool, pp. 1-5. http://www.otctools.com/products/tpr-activation-tool. Website last visited Aug. 17, 2016.
European Intellectual Property Office, European Search Report, dated Dec. 20, 2013.
European Intellectual Property Office, European Search Report, dated Mar. 12, 2014.

\* cited by examiner

DEVICE FOR ELECTRONIC SYSTEM FOR MONITORING THE PRESSURE OF THE TYRES OF A MOTOR VEHICLE

CROSS-REFERENCE TO RELATED APPLICATIONS

This application claims priority benefit to French patent application serial number 2004261 filed Apr. 29, 2020, the entire contents of which are incorporated herein by reference.

TECHNICAL FIELD

The present invention relates to the field of electronic systems for monitoring the pressure of tyres or tires ("tyre pressure monitoring system", "TPMS") for motor vehicles.

BACKGROUND

The present invention relates more particularly to a device for communicating on various frequencies, for programming, and/or pairing one or more elements, such as pressure sensors, of said electronic tyre pressure monitoring systems (it should be noted that said device is also sometimes referred to as a TPMS valve forcer).

This is because, in such systems, the pressure sensors are generally housed in the tyres of the vehicle and are associated with the on-board computer of the motor vehicle to which said sensors transmit data. The sensor/on-board computer assembly is thus designated by the term "electronic tyre pressure monitoring system".

Each pressure sensor is conventionally equipped with a radio-frequency transmitter for transmitting data to the on-board computer. The on-board computer receiving the data from the sensors can thus alert the user of the vehicle if one of the tyres were to burst or deflate, causing a risk for their safety. It should also be noted that the pressure sensors may also be equipped with a communication means of the Bluetooth type, and more particularly BLE ("Bluetooth Low Energy"), in place of or in addition to another radio-frequency transmission means.

However, the pressure sensor associated with the wheel (generally housed inside same) is not always removable, and thus changing a wheel involves changing the sensor, and the new sensor is then no longer detected by the on-board computer of the vehicle.

It is therefore necessary, when changing tyres, to pair (or associate) the sensors housed in the new tyres with the on-board computer of the vehicle. This pairing is done by means of a dedicated device (generally designated by the term "TPMS tool"), said device being configured to activate the sensors, to recover and record the relevant data sent by the sensor, such as the identifier of the sensor, and to transmit them, for example by means of an OBD cable, to the on-board computer, so that the latter can detect and locate the sensors housed in the newly installed tyres and to receive the data therefrom, in order to warn the user in the event of a drop in pressure in one of said tyres.

However, a new requirement has appeared, in addition to a pressure sensor housed in the tyre, it is advantageous to integrate an RFID tag in said tyres. Thus each tyre provided with a tag will also have an identifier making it possible, among other things: to know the characteristics of the tyre, to monitor quality and/or wear of the tyre, to facilitate management thereof (logistics, storage, etc.) whether it be in the warehouses or factories or when they are installed on vehicles (simplifying for example the management of vehicle fleets).

It should be noted that an RFID tag or radio tag is composed of an antenna designed to function in a given frequency band, and an electronic chip, connected to said antenna, which stores the data, such as a unique identifier.

In the automobile field, RFID tags are generally designed to function in the so-called UHF (ultra-high frequency) frequency band, ranging from 300 to 3000 MHz. However, the frequency bands that can be used to activate or read RFID tags are governed by the national laws of each country, without necessarily the usable frequencies overlapping. For example, in Europe, the frequency band authorised for interrogating RFID tags for this type of application is between 865 and 868 MHz, in the United States it lies between 902 and 928 MHz, whereas in China it is between 920 and 924 MHz approximately.

SUMMARY

It is thus necessary to propose a device for an electronic tyre (tire) pressure monitoring system of a motor vehicle able to communicate with the various types of RFID tag mounted in the vehicle tyres anywhere in the world. Thus said device must be capable, as before, of activating the pressure sensor and pairing it with the on-board computer of the vehicle, but must also be capable of recovering the identifier of the RFID tag of the tyre so that it is associated with the pressure sensor (by entering the identifier of the RFID tag in the memory of the pressure sensor) and/or transmitted to the on-board computer, for example to associate this information with the correct position of the tyre on the vehicle (the identifier may also be transmitted to a remote server hosting for example tyre management software, etc.).

In addition, said RFID tags are generally passive components, that is to say the tag is not self-contained energy-wise and the emission of a signal by said tag is possible only if it has received sufficient energy by means of the activation signal sent by a third-party device. It is therefore necessary to send an activation frequency on the tuning frequency of the antenna of a tag with minimum power for activating said tag.

The invention is thus a novel device for an electronic tyre pressure monitoring system of a motor vehicle, said device comprising:
  a transmission means for communicating with tyre pressure sensors;
  a means for receiving signals coming from the sensors;
  an electronic entity configured to store and/or process information conveyed by the signals sent by said sensors;
  an ultra-high frequency communication module configured to communicate with radio-frequency tags (a module also referred to hereinafter by the term "UHF module").

Said ultra-high frequency module is thus configured firstly to send electromagnetic signals triggering or activating RFID tags housed in the tyres of a motor vehicle and secondly to receive the signals sent by said RFID tags.

According to one possible feature, said device is configured to communicate information relating to an RFID tag to at least one sensor. Said device can thus activate an RFID tag, recover the identifier thereof and send it, by means of the transmission means, to the pressure sensor so that it is stored therein in memory.

According to another possible feature, said device comprises a means for communicating with an on-board computer of a motor vehicle to transmit the information from at least one sensor.

The communication means makes it possible for example to send data relating to the sensors and/or RFID tags of the tyres to the on-board computer of the vehicle.

According to one possible feature, said module is configured to transmit in a frequency band lying between 800 and 1000 MHz, more particularly between 850 and 960 MHz.

According to one possible feature, said module is configured to transmit on a first and a second frequency band $\Delta f1$ and $\Delta f2$ distinct from each other.

The first frequency band $\Delta f_1$ is between 850 and 870 MHz and the second frequency band $\Delta f_2$ between 900 and 960 MHz.

It should be noted that frequency band means a range of frequencies $\Delta f_i$ centered on a given frequency $f_i$, generally the resonant frequency of the antenna for which the conversion of an electrical signal into an electromagnetic signal will be optimum (that is to say with the least loss of energy). The range of frequencies $\Delta f_i$ thus corresponds to the minimum and maximum frequencies of use for which the attenuation does not exceed 3 dB with respect to the resonant frequency $f_i$.

According to another possible feature, said module comprises two distinct antennas, a first antenna configured to transmit on the first frequency band $\Delta f_1$ and a second antenna configured to transmit on the second frequency band $\Delta f_2$.

According to another possible feature, said module comprises at least one antenna and an antenna management circuit. Said antenna management circuit is for example an electronic circuit that manages and shapes the electrical signals received by said at least one antenna.

According to another possible feature, the module is configured to activate the first antenna and/or the second antenna. Said activation of one or both of the two antennas is for example managed by the management circuit of said module.

According to another possible feature, said module comprises one or more switches for selecting the antenna or antennas able to transmit.

According to another possible feature, said module comprises a single antenna tuned to an intermediate frequency $f_m$ situated between the first and second frequency bands $\Delta f_1$, $\Delta f_2$.

Thus said antenna has a frequency band $\Delta f_m$ partly overlapping the first and second frequency bands $\Delta f_1$, $\Delta f_2$ and in particular the center frequencies $f_1$ and $f_2$ of said bands $\Delta f_1$, $\Delta f_2$.

According to another possible feature, said module comprises an antenna that includes a plurality of antenna elements of variable lengths. More particularly, the length L of said antenna elements can thus have a value $L_1$ or a value $L_2$, the value $L_1$ making it possible to tune the antenna to the first frequency $f_1$ and to transmit on a frequency band $\Delta f_1$, while the value $L_2$ makes it possible to tune the antenna to the second frequency $f_2$ and to transmit on a frequency band $\Delta f_2$.

According to another possible feature, said antenna elements each comprise at least one switch configured to vary the length of said antenna elements.

According to another possible feature, said module comprises an antenna including a plurality of antenna elements of various lengths, a first length $L_1$ making it possible to tune the antenna to a frequency $f_1$ and a second length $L_2$ making it possible to tune the antenna to a frequency $f_2$.

According to another possible feature, said antenna comprises one or more switches for selecting the antenna elements able to transmit. It is thus possible to select the optimum antenna for transmitting on a given frequency or given frequency band.

BRIEF DESCRIPTION OF THE DRAWINGS

The invention will be understood better, and other aims, details, features and advantages thereof will appear more clearly in the course of the following description of particular embodiments of the invention, given solely by way of illustration and non-limitatively, with reference to the accompanying drawings, on which.

DETAILED DESCRIPTION

Figure 1:
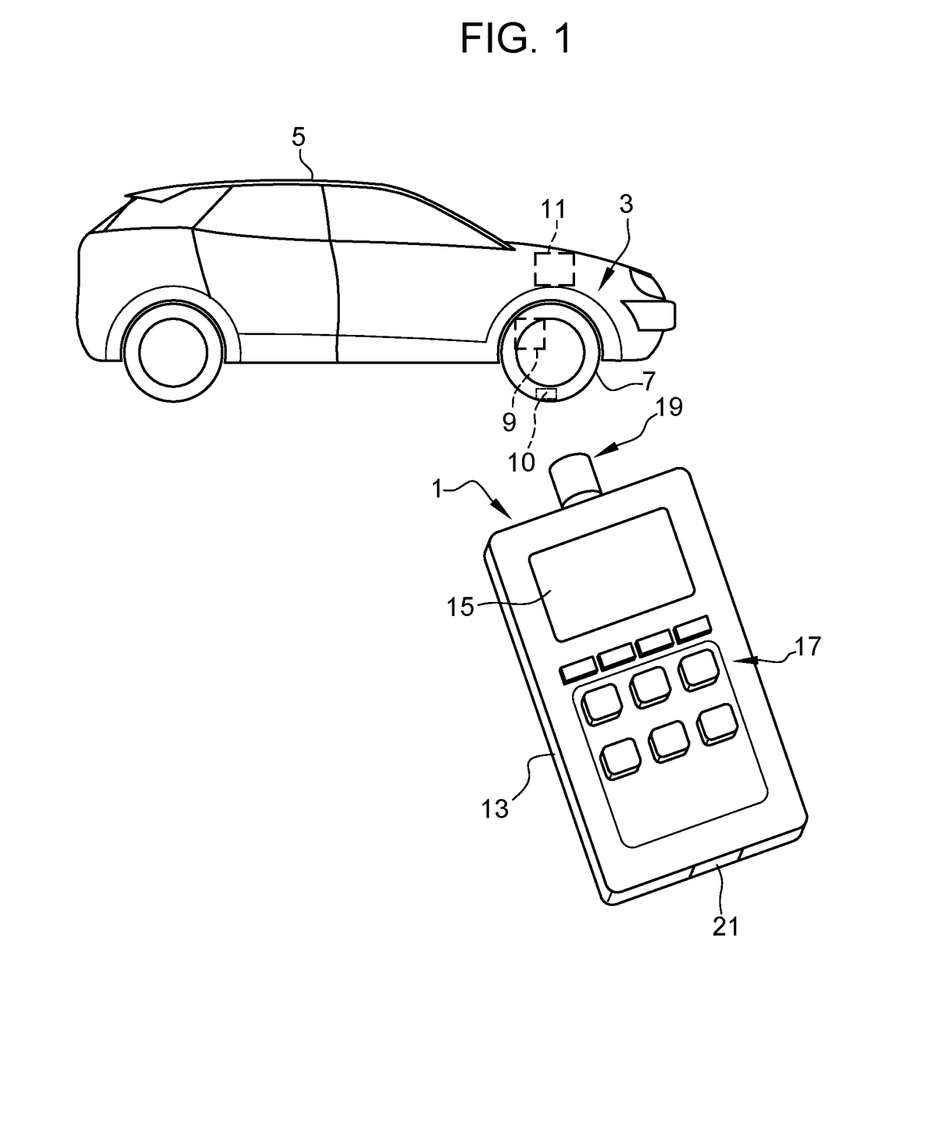
FIG. 1 is a schematic representation illustrating a first embodiment of a TPMS device according to the invention.

FIG. 1 is a highly schematic representation of a device 1 for activating sensors 9, more particularly in the present example of a device 1 for an electronic system for monitoring the pressure of the tyres (tires) 7 of a motor vehicle 5 (said device 1 also being able to be designated by the terms "valve activator" or "valve forcer").

The motor vehicle 5 firstly is equipped with tyres 7 wherein the sensors 9 are housed, such as pressure sensors, and secondly comprises an on-board computer 11 (also referred to as an electronic control unit generally designated by the abbreviation "ECU").

Said tyres 7 also comprise at least one radio-frequency identification tag 10, hereinafter referred to by the term RFID (radio-frequency identification) tag. Each of said tags 10 thus comprises an antenna associated with an electronic chip that enables said tags to receive and respond to radio-transmitted requests. More particularly, each of said tags 10 has an identifier, generally unique, stored in said electronic chip, this identifier being transmitted by said tag 10 provided that the tag has received the appropriate signal (the appropriate signal generally being a modulated electromagnetic signal having a specific frequency).

According to the regions of the world, since the national legislations are not harmonised, said tags 10 for this type of application may have (interrogation and/or response) frequencies ranging from 860 to 960 MHz.

The device 1 comprises a housing 13, for example made from plastics material, a display device 15, a keypad 17 and an antenna 19 for transmitting a sensor-activation signal, as well as an OBD socket 21 (an OBD socket that is optional). Said OBD socket 21 is configured to allow for example the connection of the device 1 to the on-board computer 11 of a vehicle, in particular by means of an OBD cable or a dongle.

Figure 2:
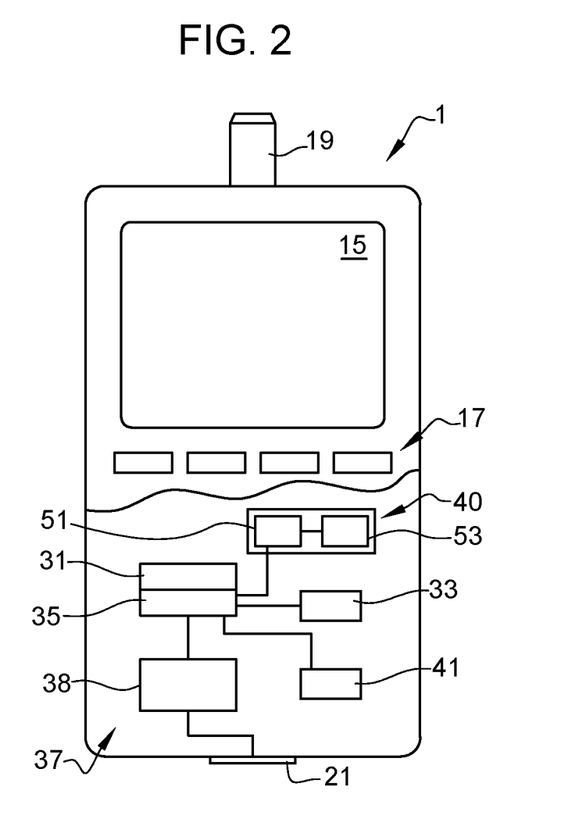
FIG. 2 is an enlarged, partially cut-away, schematic detail view of the device of FIG. 1.

FIG. 2 is an enlarged, partially cut-away detail view of the device 1 of FIG. 1.

Said device 1 thus comprises:
- at least one sensor transmission means 31, such as means for generating (continuous and/or modulated) sensor-activation signals, said transmission means 31 comprising the antenna 19 that makes it possible in particular to best propagate said generated signals to the sensors 9;
- a means 33 for receiving signals coming from the sensors, generally another antenna housed in the housing 13 and configured for example to receive signals in a frequency band between 300 and 500 MHz (the sensor transmitting a signal after having been activated by said transmission means 31);
- an electronic entity 35 configured to store and/or process information conveyed by the signals transmitted by said sensors 9 (and received by means of the reception means 33);
- an ultra-high frequency communication module 40 in particular configured to communicate with radio-frequency tags, for example over a frequency range lying between 800 and 1000 MHz.

The device 1 may also comprise a means 37 for communicating with an on-board computer 11 of a motor vehicle to transmit the information from at least one of said sensors 9, information received by means of signals coming from said sensors 9. The communication means 37 is for example an OBD module that comprises a circuit 38 for managing the OBD communication and the OBD socket 21 mentioned previously. It should be noted that the management circuit 38 may also be integrated in the electronic entity 35. The device 1 also comprises a battery 41 configured to power the various elements.

Said device 1 is thus configured to communicate (for example by the transmission means 31) information relating to an RFID tag to at least one sensor and/or to communicate (by means of the communication means 37) information relating to an RFID tag and/or to sensors to the on-board computer of the vehicle.

It should also be noted that said activation signals are electromagnetic signals, continuous or modulated, transmitted by the activation means 31, which have for example a frequency of 125 kHz.

The ultra-high frequency communication module 40 for its part comprises a management circuit 51 and at least one antenna 53 configured to transmit on at least a first and a second distinct frequency band Δf1 and Δf2 spaced apart from each other (that is to say which do not overlap).

The first frequency band Δf1 is for example between 850 and 870 MHz, while the second frequency band Δf2 is for example between 900 and 950 MHz. More particularly, the second band Δf2 is between 900 and 930 MHz.

Figure 3:
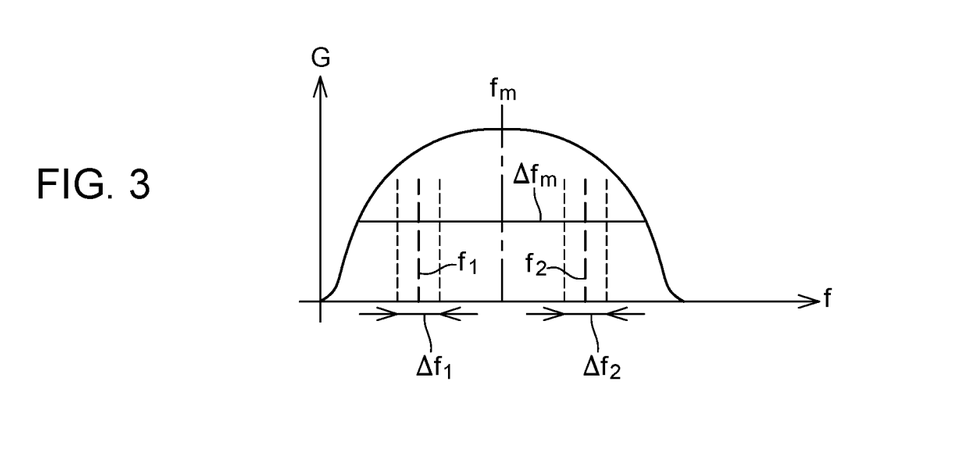
FIG. 3 is a graph showing the gain as a function of the frequency of the signal sent by the ultra-high frequency communication module of the device of FIG. 1.

The antenna 53 is thus tuned to a resonant frequency fm, referred to as the intermediate frequency, situated between the first and the second frequency bands Δf1, Δf2. In addition, as illustrated in FIG. 3, the frequency band $\Delta f_m$, referred to as the intermediate frequency band, on which the antenna 53 is able to transmit (a band also designated by the term bandwidth of the antenna) comprises the center frequencies f1 and f2 of the first and second frequency bands Δf1 and Δf2.

In addition, the intermediate frequency band $\Delta f_m$ at least partly overlaps, or even encompasses, the first and second frequency bands Δf1, Δf2, for example at around 867.5 MHz to activate RFID tags functioning in Europe and at around 902 MHz to activate RFID tags functioning in the United States.

It should be noted that the management circuit 51 is a circuit or an electronic module configured to shape and send the appropriate electrical signal to an antenna, so that the latter transmits an electromagnetic signal that can be used by said RFID tags 10.

Figure 4A:
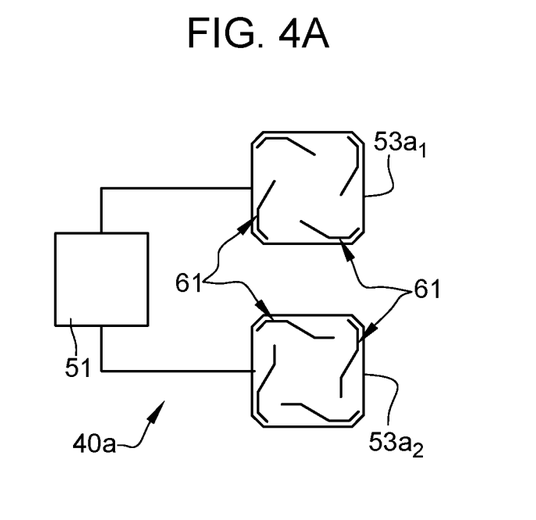
FIG. 4A is a highly schematic representation of another embodiment of the device according to the invention, and more particularly of the ultra-high frequency communication module.

In a second embodiment, the device is identical to the device in FIG. 1, except for the ultra-high frequency communication module, a module 40a that is more particularly illustrated in FIG. 4A.

Figure 5A:
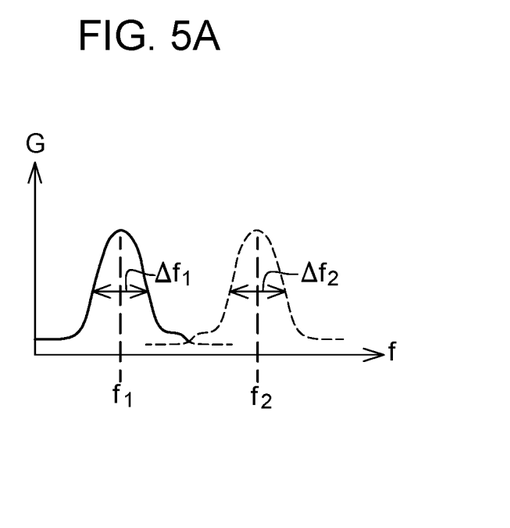
FIG. 5A is a graph showing the gain as a function of the frequency of the signal transmitted from the module shown in FIG. 4A.

Said communication module 40a comprises an antenna management circuit 51, a first antenna 53a1 and a second antenna 53a2 distinct from each other. The first antenna 53a1 is tuned to the first frequency band Δf1 and the second antenna 53a2 is tuned to the second frequency band Δf2. It should be noted that distinct antennas means the fact that the radiating elements 61 (antenna elements) of said antennas 53a1 and 53a2 are disposed on substrates that are distant from each other. The electromagnetic signals that can be transmitted by the first and second antennas 53a1 and 53a2 are more particularly illustrated in FIG. 5A.

In addition, in a variant, not shown, of the second embodiment, the communication module 40a comprises one or more switches configured to activate the first antenna 53a1 and/or the second antenna 53a2. Thus, according to the national legislations on the frequency bands that can be used, one of the antennas can be deactivated in order to avoid transmitting an electromagnetic signal on a prohibited frequency band. Moreover, if the device according to the invention is caused to change country, it is possible to modify the antennas that can be used.

Figure 4B:
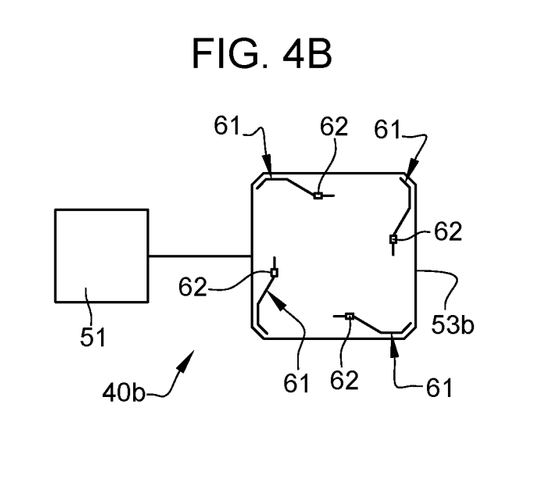
FIG. 4B is a highly schematic representation of another embodiment of the device according to the invention, and more particularly of the ultra-high frequency communication module.

In a third embodiment, the device is identical to the device in FIG. 1, except for the ultra-high frequency communication module, said module 40b is more particularly illustrated in FIG. 4B.

Said module 40b thus comprises a management circuit 51 and an antenna 53b that includes a plurality of antenna elements 61 (radiating elements) of variable lengths L. That is to say the length L of the radiating elements may vary, for example from a first length L1 to a second length L2 (and vice versa). In addition, the antenna elements 61 comprise a switch 62 for modifying the length of said elements 61, said switches 62 being for example controlled by said management circuit 51.

Figure 5B:
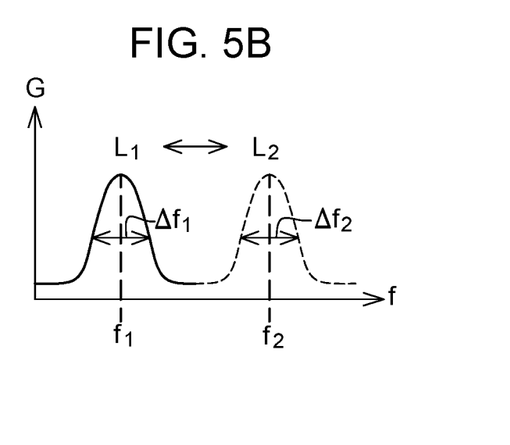
FIG. 5B is a graph showing the gain as a function of the frequency of the signal transmitted from the module shown in FIG. 4B.

Thus, as illustrated in FIG. 5, the gain (G) of the signal transmitted, as a function of frequency, depends on the length of the antenna elements 61, the resonant frequency of said antenna 53b is thus modified by means of the switches 62, the first length L1 of the antenna elements corresponding to a first resonant frequency f1 and the second length L2 of the antenna elements corresponding to a second resonant frequency f2.

Figure 4C:
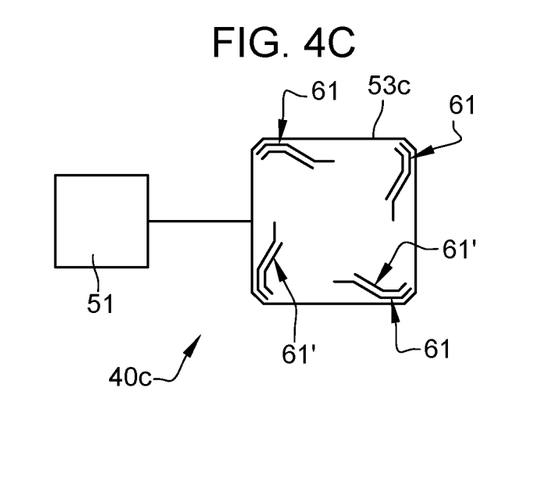
FIG. 4C is a highly schematic representation of another embodiment of the device according to the invention, and more particularly of the ultra-high frequency communication module.

In a fourth embodiment, the device is identical to the device in FIG. 1, except for the communication module 40c, which is modified, and which is more particularly illustrated in FIG. 4C.

Said module 40c thus comprises a management circuit 51 and an antenna 53c that includes a plurality of antenna elements (radiating elements) 61 and 61' with at least two different lengths.

Figure 5C:
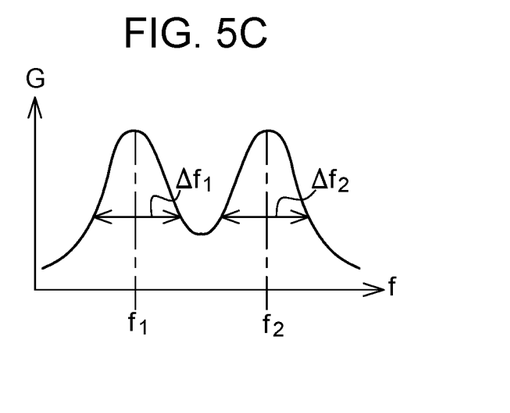
FIG. 5C is a graph showing the gain as a function of the frequency of the signal transmitted from the module shown in FIG. 4C.

The antenna 53c thus comprises first antenna elements 61 having at least a first length L1 making it possible to transmit on the first frequency band Δf1 (the center frequency of which is f1) and second antenna elements 61' having at least a second length L2 making it possible to transmit on the second frequency band Δf2 (the center frequency of which is f2). There is thus an antenna 53c characterised by FIG. 5C illustrating the gain as a function of frequency, wherein the gain has two maxima respectively at the first and second frequencies f1 and f2.

The frequency of the electromagnetic wave (or signal) transmitted by the antenna 53c is then a function of the frequency of the electrical signal delivered by the management circuit 51 to the antenna 53c (this is because, if the frequency of said electrical signal is f1 then the electromagnetic signal has a frequency substantially equal to f1). The management circuit 51 can therefore select the frequency of the electromagnetic signal transmitted by the antenna 53c so that this corresponds to a frequency authorised on the territory where the device is used. In addition, the gain being maximum around the frequencies sought, the signal transmitted will have sufficient power to activate an RFID tag, for example passive.

The device 1 according to the invention, whatever the embodiment, thus makes it possible to transmit ultra-high frequency signals on at least two distinct frequency bands Δf1 and Δf2 centered on frequencies f1 and f2 corresponding to the operating frequencies of tags according to various regions in the world, with sufficient power to activate said tags.

The frequencies f1 and f2 may for example take any value in one of the following ranges:

TABLE 1

| Region | Frequency band |
| --- | --- |
| Europe | 869.4 to 869.65 MHz |
|  | 865 to 868 MHz |
|  | 865.6 to 867.6 MHz |
|  | 865.6 to 868 MHz |
| America | 902 to 928 MHz |
| Asia and Oceania | Japan: 952 to 954 MHz |
|  | Korea: 908.5 MHz to 914 MHz |
|  | Australia: 915 to 928 MHz |

These frequency values (or authorized frequency bands) are dependent on the national legislations, but may also depend on the RFID tags that it is wished to activate, a device being able to be designed to activate one or more types of RFID tag having specific operating frequencies.

In another variant embodiment, not shown, the device according to the invention comprises a GPS chip enabling it to be located geographically, said device being configured to transmit electromagnetic signals solely on the frequency bands authorized according to said geographical location.

In another variant embodiment, not shown, the device is configured so that the country where the device is located is indicated by the user, for example when the appliance is first used, so that the transmission of electromagnetic signals on the prohibited frequency bands is restricted.

It should also be noted that the antenna or antennas of said ultra-high frequency module of the different embodiments and variants mentioned above may be: a patch antenna, an IFA antenna ("inverted F antenna"), a PIFA antenna ("planar inverted F antenna"), a folded dipole antenna, a meander antenna, a fractal antenna, an MFNSPA antenna ("Minkowski fractal nested-slot patch antenna"), etc.

What is claimed is:

1. A device for an electronic tire pressure monitoring system of a motor vehicle, said device comprising:
    a transmission means for communicating with at least one tire pressure sensor positioned in a respective tire;
    a means for receiving signals coming from the at least one tire pressure sensor;
    an electronic entity operable to at least one of store or process information conveyed by the signals sent by said at least one tire pressure sensor; and
    an ultra-high frequency communication module operable to communicate with a tire radio-frequency identification (RFID) tag mounted in the respective tire, the tire RFID tag including a tire RFID tag identifier and a characteristic of the respective tire, the ultra-high frequency module configured to receive the tire RFID tag identifier.

2. The device according to claim 1, wherein the device is operable to communicate the tire RFID tag identifier to the respective at least one tire pressure sensor.

3. The device according to claim 2, wherein the device further comprises a means for communicating with an electronic control unit (ECU) of a motor vehicle to transmit the at least one tire pressure sensor information and the tire RFID tag identifier received from the respective at least one tire pressure sensor.

4. The device according to claim 1, wherein the ultra-high frequency module is configured to receive the tire characteristic of the respective tire from the tire RFID tag, the device further comprises a means for communicating with an electronic control unit (ECU) of a motor vehicle to transmit the tire RFID tag identifier and the tire characteristic received from the tire RFID tag to the ECU.

5. The device according to claim 4, wherein said ultra-high frequency module is operable to transmit in a frequency band between 800 and 1000 MHz.

6. The device according to claim 1, wherein said ultra-high frequency module is operable to transmit in a frequency band between 800 and 1000 MHz.

7. A device for an electronic tire pressure monitoring system of a motor vehicle, said device comprising:
    a transmission means for communicating with at least one tire pressure sensor positioned in a respective tire;
    a means for receiving signals coming from the at least one tire pressure sensor;
    an electronic entity operable to at least one of store or process information conveyed by the signals sent by said at least one tire pressure sensor; and
    an ultra-high frequency communication module operable to communicate with a radio-frequency identification (RFID) tag positioned in the respective tire, said ultra-high frequency module is operable to transmit on at least a first and a second frequency band ($\Delta f_1$ and $\Delta f_2$), the second frequency band distinct from the first frequency band.

8. The device according to claim 7 wherein said ultra-high frequency module further comprises a first antenna operable to transmit on the first frequency band $\Delta f_1$ and a second antenna operable to transmit on the second frequency band $\Delta f_2$, the second antenna distinct from the first antenna.

9. The device according to claim 8, wherein the ultra-high frequency module is operable to selectively activate at least one of the first antenna or the second antenna.

10. The device according to claim 7, wherein said ultra-high frequency module further comprises a single antenna tuned to an intermediate frequency $f_m$ positioned between the first $\Delta f_1$ and the second $\Delta f_2$ frequency bands.

11. The device according to claim 7, wherein said ultra-high frequency module further comprises an antenna that includes a plurality of antenna elements each having a variable length.

12. The device according to claim 11, wherein said plurality of antenna elements each comprise at least one switch operable to vary the length of said respective antenna element.

13. The device according to claim 7, wherein said ultra-high frequency module comprises a plurality of antenna elements, each of the plurality of antenna elements comprising a first antenna element having a first length operable to tune the first antenna to a first frequency $f_1$ and a second antenna having a second length operable to tune the second antenna to a second frequency $f_2$, the second frequency different than the first frequency.

14. The device according to claim 13, wherein said ultra-high frequency module further comprises one or more switches operable to select the first antenna or the second antenna to transmit.

15. A tire pressure monitoring system (TPMS) tool for use with a TPMS of a motor vehicle, said tool comprising:
a signal transmitter operable to send signals to a tire pressure sensor positioned in a motor vehicle tire;
a signal receiver operable to receive information signals from the tire pressure sensor;
an electronic entity operable to at least one of store or process information from the signals received from the tire pressure sensor; and
an ultra-high frequency communication module operable to send signals to and receive information signals from a tire radio-frequency identification (RFID) tag directly connected to the tire, the tire RFID tag including a tire RFID tag identifier, the ultra-high frequency module comprising:
at least one antenna;
a management circuit;
a first frequency band $\Delta f_1$; and
a second frequency band $\Delta f_2$, the second frequency band distinct from the first frequency band, the tool operable to selectively transmit the signals to the tire RFID tag to include at least one of the first frequency band or the second frequency band through the at least one antenna in compliance with an authorized RFID frequency transmission band of a geographic location where the tire RFID tag is located.

16. The tool of claim 15, wherein the tire RFID tag further includes a characteristic of the tire and the ultra-high frequency module is configured to receive the tire characteristic of the respective tire from the tire RFID tag, the device is operable to send the tire RFID tag identifier and the tire characteristic to the tire pressure sensor, the tire pressure sensor operable to store the tire RFID tag identifier and the tire characteristic sent by the tool.

17. The tool of claim 16 wherein the received information signals from the tire pressure sensor includes tire pressure sensor information and the tire RFID tag identifier and the tire characteristic.

18. The tool of claim 15 wherein the first frequency band is between 800 and 870 MHz and the second frequency band is between 900 and 950 MHz.

19. A device for an electronic tire pressure monitoring system of a motor vehicle, said device comprising:
a transmission means for communicating with at least one tire pressure sensor positioned in a respective tire;
a means for receiving signals coming from the at least one tire pressure sensor;
an electronic entity operable to at least one of store or process information conveyed by the signals sent by said at least one tire pressure sensor; and
an ultra-high frequency communication module operable to communicate with a radio-frequency identification (RFID) tag positioned in the respective tire, said ultra-high frequency module is operable to transmit on at least a first and a second frequency band ($\Delta f_1$ and $\Delta f_2$), the second frequency band distinct from the first frequency band, and wherein said ultra-high frequency module is operable to transmit in a frequency band between 800 and 1000 MHz.

\* \* \* \* \*